United States Patent
Lynar et al.

(10) Patent No.: US 8,676,442 B2
(45) Date of Patent: Mar. 18, 2014

(54) IN-VEHICLE DRIVE PATTERN OPTIMIZATION FOR REDUCED ROAD WEAR

(75) Inventors: Timothy M. Lynar, Carlton Vic (AU); Kent C. Steer, Carlton Vic (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/474,822

(22) Filed: May 18, 2012

(65) Prior Publication Data
US 2013/0311041 A1 Nov. 21, 2013

(51) Int. Cl.
*G06F 17/00* (2006.01)
(52) U.S. Cl.
USPC .................................. 701/41; 701/50
(58) Field of Classification Search
USPC ...................................... 701/41, 50
See application file for complete search history.

(56) References Cited

U.S. PATENT DOCUMENTS

| | | | |
|---|---|---|---|
| 6,275,773 B1 * | 8/2001 | Lemelson et al. | 701/301 |
| 6,763,292 B1 | 7/2004 | Smith et al. | |
| 7,720,587 B2 | 5/2010 | McDonald et al. | |
| 2003/0065432 A1 * | 4/2003 | Shuman et al. | 701/48 |
| 2008/0243381 A1 * | 10/2008 | Villalobos et al. | 701/211 |
| 2010/0036557 A1 * | 2/2010 | Lu | 701/29 |

* cited by examiner

*Primary Examiner* — Mary Cheung
*Assistant Examiner* — Yuen Wong
(74) *Attorney, Agent, or Firm* — Tutunjian & Bitetto, P.C; Vazken Alexanian

(57) ABSTRACT

The present principles are directed to in-vehicle drive pattern optimization for reduced road wear. A method includes monitoring statuses of various vehicle functions. The method further includes controlling the various vehicle functions to optimize the vehicle drive pattern for reduced road wear, responsive to an output of the monitoring step and known information at least about a road segment currently being or about to be traversed.

13 Claims, 8 Drawing Sheets

IN-VEHICLE DRIVE PATTERN OPTIMIZATION FOR REDUCED ROAD WEAR

BACKGROUND

1. Technical Field

The present principles relate generally to vehicle infrastructure and, in particular, to in-vehicle drive pattern optimization for reduced road wear.

2. Description of the Related Art

The maintenance of roads is expensive and disruptive to all road users. The majority of damage to roads is caused by only a small number of road users, that is, heavy vehicles such as buses, semi-trailers, B-doubles, and so forth. The damage caused by a vehicle is proportional to the fourth power of the load on each axle. Axle loads increase significantly when vehicles brake and accelerate due to load shifting (e.g., when a vehicle brakes the load on the front axles increases).

SUMMARY

According to an aspect of the present principles, an in-vehicle drive pattern optimization method is provided. The method includes monitoring statuses of various vehicle functions. The method further includes controlling the various vehicle functions to optimize the vehicle drive pattern for reduced road wear, responsive to an output of the monitoring step and known information at least about a road segment currently being or about to be traversed.

According to another aspect of the present principles, an in-vehicle drive pattern optimizer is provided. The optimizer includes a vehicle status monitor for monitoring statuses of various vehicle functions. The optimizer also includes a vehicle drive pattern optimization controller for controlling the various vehicle functions to optimize the vehicle drive pattern for reduced road wear, responsive to an output of the vehicle status monitor and known information at least about a road segment currently being or about to be traversed.

According to yet another aspect of the present principles, an in-vehicle drive pattern optimization method is provided. The method includes monitoring statuses of various vehicle functions. The method also includes providing a user perceptible indication of a suggested vehicle driving pattern that reduces road wear responsive to an output of the monitoring step and known information about a road segment currently being or about to be traversed.

According to still another aspect of the present principles, there is provided an in-vehicle drive pattern optimizer. The optimizer includes a vehicle status monitor for monitoring statuses of various vehicle functions. The optimizer also includes a suggested vehicle driving pattern indicator for providing a user perceptible indication of a suggested vehicle driving pattern that reduces road wear responsive to an output of the vehicle status monitor and known information about a road segment currently being or about to be traversed.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to in-vehicle drive pattern optimization for reduced road wear. In an embodiment, the present principles provide a way to modify the drive pattern of vehicles such that the cost of maintaining a road (to within certain quality constraints) is minimized. This modification is achieved through an in-vehicle system which determines an optimal drive pattern and provides an output. This output is based on limited incoming and stored information that, depending on the embodiment of the present principles, may include but is not limited to: traffic conditions; road conditions; vehicle location; vehicle speed; vehicle acceleration; traffic signals; a model of vehicle dynamics; speed limits; driver input; route information; area map; weather; and estimated accumulation of wear per road segment. The output is an optimal drive pattern which specifies, for example, the use (timing and amplitude) of the accelerator and brake and, thereby, the velocity. This information can be used either to directly control the vehicle (e.g., through electronic actuators), to dampen user initiated control over the vehicle, or to inform the driver so that he or she can make the necessary changes.

Figure 1:
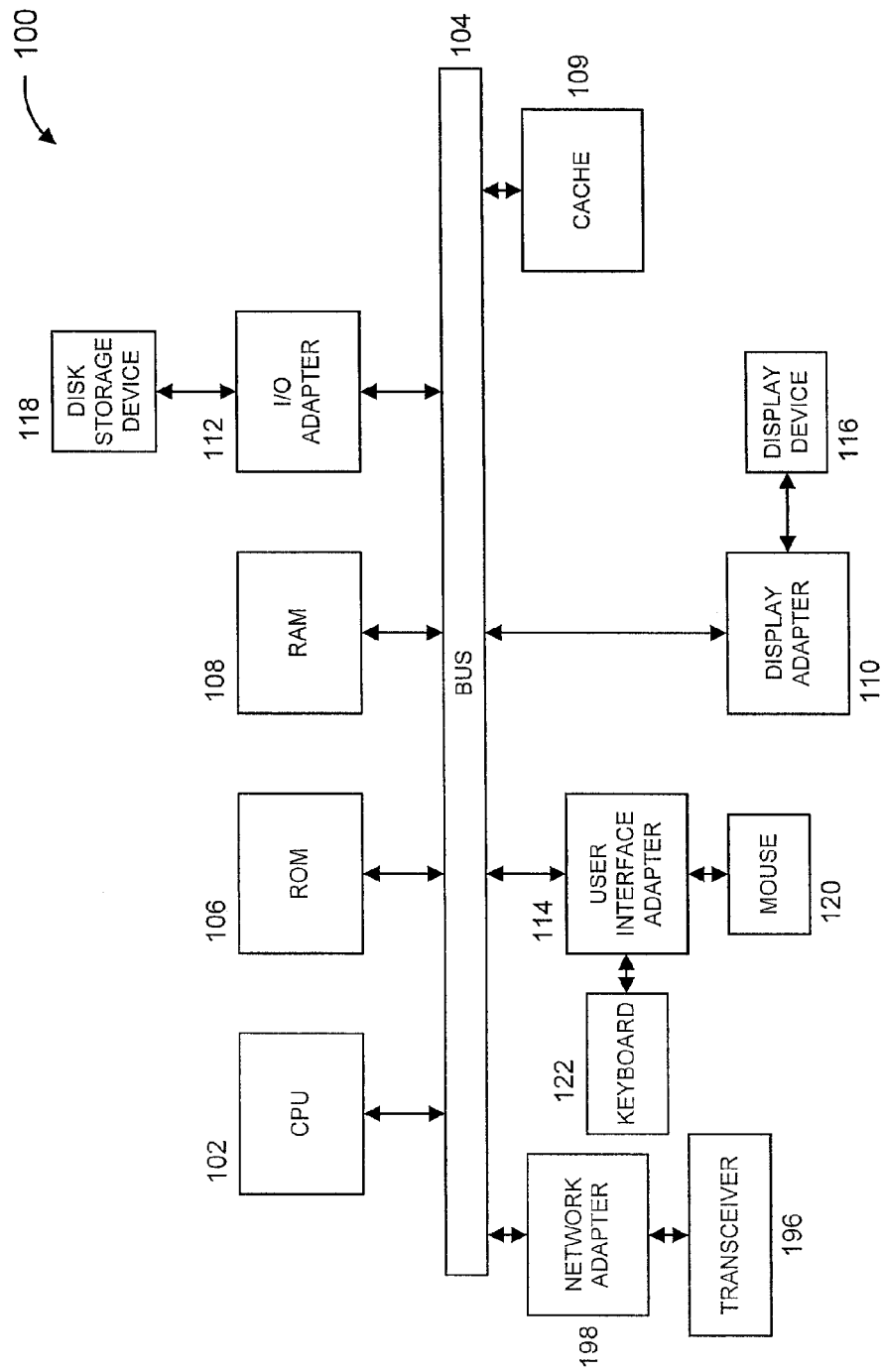
FIG. 1 is a block diagram showing an exemplary processing system 100 to which the present principles may be applied, in accordance with an embodiment of the present principles.

FIG. 1 shows an exemplary processing system 100 to which the present invention may be applied, in accordance with an embodiment of the present invention. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A transceiver 196 is operatively coupled to system bus 104 by network adapter 198. Of course, the processing system 100 may also include other elements (not shown), as readily contemplated by one of skill in the art, as well as omit certain elements.

Figure 2:
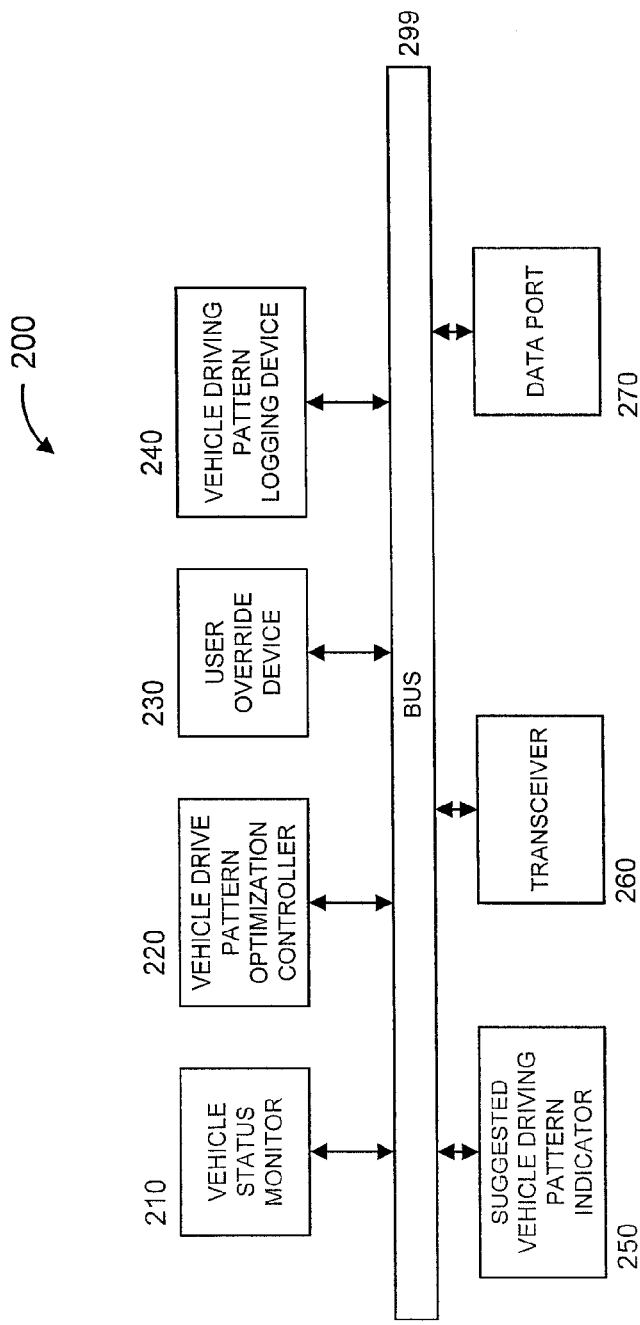
FIG. 2 is a block diagram showing an exemplary system 200 for in-vehicle drive pattern optimization for reduced road wear, in accordance with an embodiment of the present principles.

FIG. 2 is a block diagram showing an exemplary system 200 for in-vehicle drive pattern optimization for reduced road wear, in accordance with an embodiment of the present principles. The system 200 includes a vehicle status monitor 210, a vehicle drive pattern optimization controller 220, a user override device 230, a vehicle driving pattern logging device 240, a suggested vehicle driving pattern indicator 250, a transceiver 260, and a data input port 270. The preceding elements of system 200 may be interconnected, as well as being connected to corresponding elements of a subject vehicle, using a bus 299.

The vehicle status monitor 200 is for monitoring the status of various vehicle functions/parameters. For example, such vehicle functions/parameters may include, but are not limited to, braking, speed, acceleration, steering, and so forth.

The vehicle drive pattern optimization controller 220 is for controlling various vehicle functions to optimize the vehicle drive pattern, responsive to an output of the vehicle status monitoring. For example, such functions may include, but are not limited to, braking, acceleration, steering, and so forth.

The user override device 230 is for overriding the controlling of various vehicle functions by the vehicle drive pattern optimization controller 220. In this way, a user can always have and/or otherwise regain control of the vehicle.

The vehicle driving pattern logging device 240 is for logging the driving pattern of the user on the road. In this way, it can be later determined whether or not a particular driver of a particular vehicle complied with suggested vehicle patterns for minimizing road wear as provided by the system 200.

The suggested vehicle driving pattern indicator 250 is for providing a user perceptible indication of a suggested vehicle driving pattern. Such indication may be provided visually, audibly, tactilely, and so forth. Accordingly, such suggested vehicle driving pattern indicator 250 may be implemented in the form of one or more of a light, a display, one or more speakers, a vibrating device, and so forth. For example, in the case of a light, the light may be one of several lights, with each of the lights representing a different action to be taken by the vehicle operator in order to minimize road wear. In the case of speakers, the speakers may simply announce the action(s) to be taken. In the case of a vibrating device, different vibration patterns and/or frequencies and/or so forth may be used to indicate the action(s) to be taken. These and other uses of such indicating elements are readily determined by one of ordinary skill in the art, given the teachings of the present principles provided herein.

The transceiver 260 and data input port 270 is for receiving road and ambient information contemporaneously or preferably in advance of driving over such relevant road segments, in order to optimize the driving pattern to minimize wear of such road segments. The transceiver 260 may be used to receive such road information while the vehicle is moving (or stationary of course), while the data input port 270 may be used, for example, at certain locations, such as a truck stop, a vehicle maintenance facility, and so forth. The information capable of being provided by the transceiver 260 and data input port 270 includes, but is not limited to, traffic conditions, road conditions, traffic signals, speed limits, route information, area map, weather, and so forth.

Figure 3:
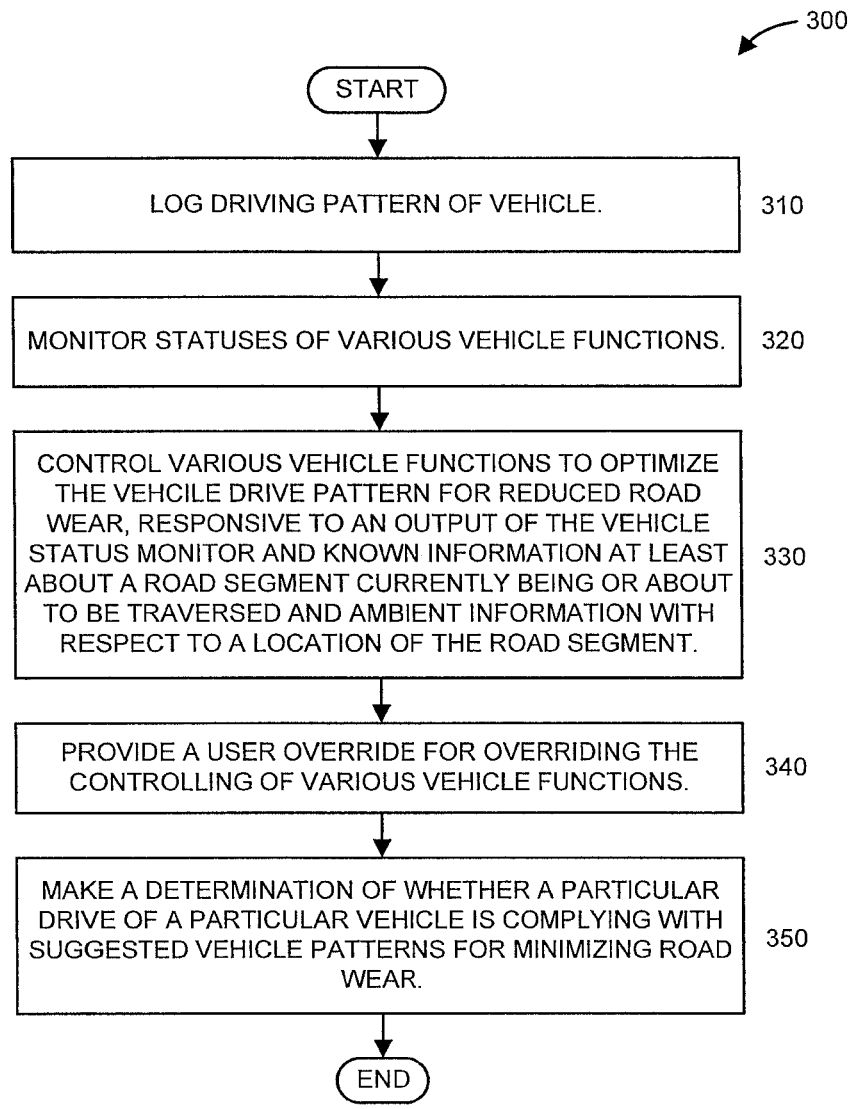
FIG. 3 is a flow diagram showing an exemplary method 300 for in-vehicle drive pattern optimization for reduced road wear, in accordance with an embodiment of the present principles.
Figure 4:
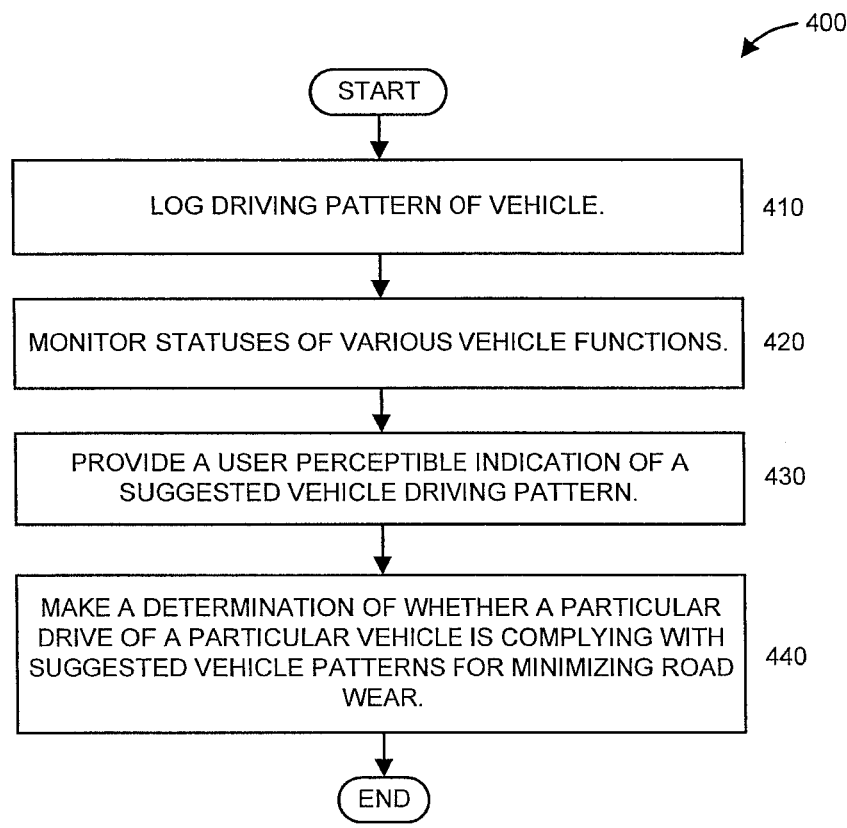
FIG. 4 is a flow diagram showing another exemplary method 400 for in-vehicle drive pattern optimization for reduced road wear, in accordance with an embodiment of the present principles.
Figure 5:
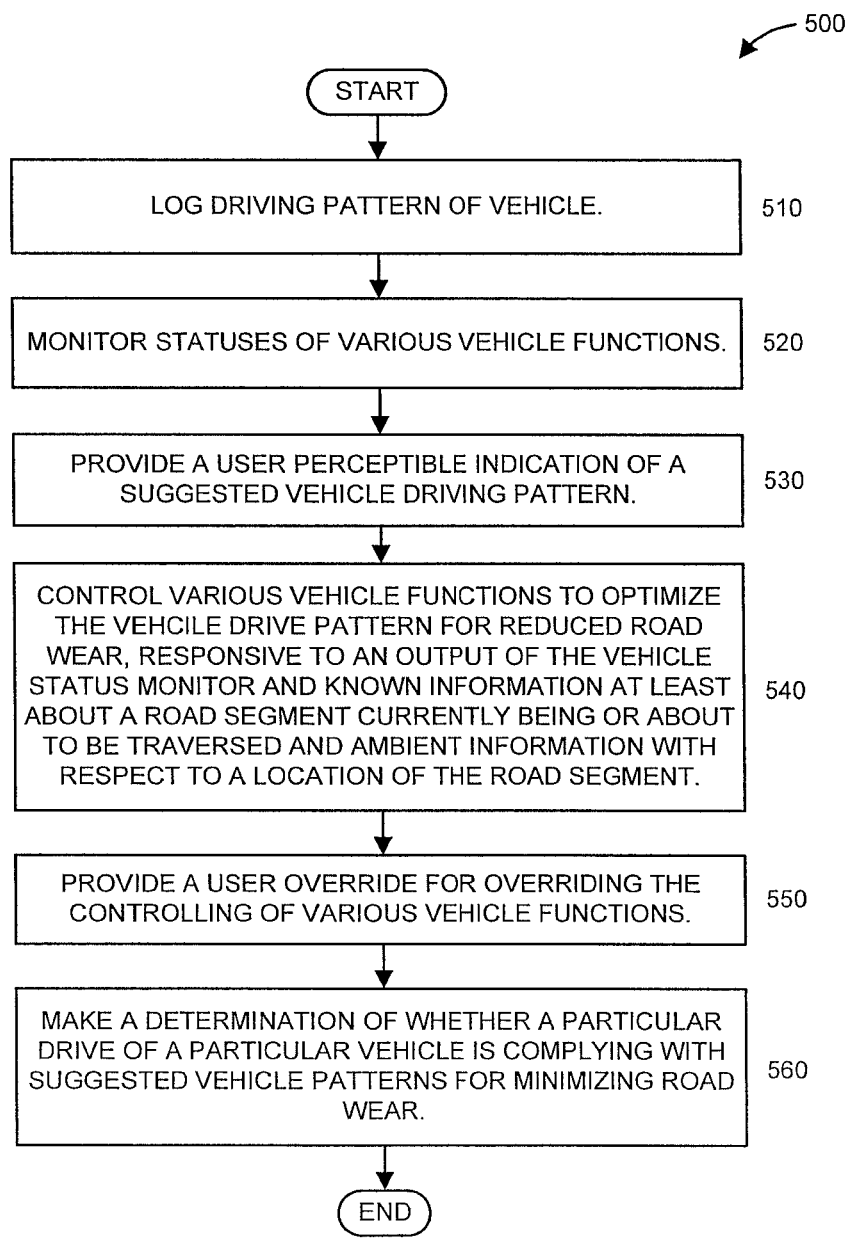
FIG. 5 is a flow diagram showing yet another exemplary method 500 for in-vehicle drive pattern optimization for reduced road wear, in accordance with an embodiment of the present principles.

Following FIGS. 3-5 correspond to various embodiments of the present principles. In particular, FIG. 3 is directed to an embodiment where the vehicle is automatically controlled in a manner to reduce road wear, FIG. 4 is directed to an embodiment where a vehicle operator is prompted with actions to be taken by the vehicle operator (e.g., brake moderately, accelerate moderately, etc.) to reduce road wear, and FIG. 5 is a composite of the embodiments of FIGS. 3 and 4 where a vehicle operator is prompted with actions to be taken and the vehicle is also automatically controlled. In the embodiments of FIGS. 3 and 5, a vehicle operator override is provided to override the automatic control of the vehicle.

FIG. 3 is a flow diagram showing an exemplary method 300 for in-vehicle drive pattern optimization for reduced road wear, in accordance with an embodiment of the present principles.

At step 310, a driving pattern of the vehicle is logged.

At step 320, statuses of various vehicle functions are monitored by the vehicle status monitor 210. The various vehicle functions can include, but are not limited to braking, acceleration, and/or steering. An output of step 320 may include, for example, parameters of the various monitored vehicle functions.

At step 330, various vehicle functions are controlled by the vehicle drive pattern optimization controller 220 to optimize the vehicle drive pattern for reduced road wear, responsive to an output of the vehicle status monitor 210 and known information at least about a road segment currently being or about to be traversed and ambient information with respect to a location of the road segment. As used herein, "about to be traversed" means at some point in the future.

At step 340, a user override is provided by the user override device 230 for overriding the controlling of various vehicle functions by the vehicle drive pattern optimization controller 220.

At step 350, a determination is made of whether a particular driver of a particular vehicle is complying with suggested vehicle patterns for minimizing road wear. Such determination may be made, for example, using the logged driving pattern relating to step 310. The determination may consider whether the user override was invoked by the vehicle operator (at step 340).

FIG. 4 is a flow diagram showing another exemplary method 400 for in-vehicle drive pattern optimization for reduced road wear, in accordance with an embodiment of the present principles.

At step 410, a driving pattern of the vehicle is logged.

At step 420, statuses of various vehicle functions are monitored by the vehicle status monitor 210. The various vehicle functions can include, but are not limited to braking, acceleration, and/or steering. An output of step 420 may include, for example, parameters of the various monitored vehicle functions.

At step 430, a user perceptible indication of a suggested vehicle driving pattern is provided by the suggested vehicle driving pattern indicator 250.

At step 440, a determination is made of whether a particular driver of a particular vehicle is complying with suggested vehicle patterns for minimizing road wear. Such determination may be made, for example, using the logged driving pattern relating to step 410.

FIG. 5 is a flow diagram showing yet another exemplary method 500 for in-vehicle drive pattern optimization for reduced road wear, in accordance with an embodiment of the present principles.

At step 510, a driving pattern of the vehicle is logged.

At step 520, statuses of various vehicle functions are monitored by the vehicle status monitor 210. The various vehicle functions can include, but are not limited to braking, acceleration, and/or steering. An output of step 520 may include, for example, parameters of the various monitored vehicle functions.

At step 530, a user perceptible indication of a suggested vehicle driving pattern is provided by the suggested vehicle driving pattern indicator 250.

At step 540, various vehicle functions are controlled by the vehicle drive pattern optimization controller 220 to optimize the vehicle drive pattern for reduced road wear, responsive to an output of the vehicle status monitor 210 and known information at least about a road segment currently being or about to be traversed and ambient information with respect to a location of the road segment. Such control may be provided, for example, if the vehicle operator does not take the suggested action at step 320. Alternatively, such control may be provided to supplement any vehicle operator action. For example, in an embodiment, a user action may be determined as an attempt to follow a suggested vehicle driving pattern, but such action may be deemed to fall somewhat short in its' intended goal. In such a case, such user action can be supplemented by the vehicle drive pattern optimization controller 220. These and other variations in implementations of the present principles are readily determined by one of ordinary skill in the art, given the teachings of the present principles provided herein, while maintaining the spirit of the present principles.

At step 550, a user override is provided by the user override device 230 for overriding the controlling of various vehicle functions by the vehicle drive pattern optimization controller 220.

At step 560, a determination is made of whether a particular driver of a particular vehicle is complying with suggested vehicle patterns for minimizing road wear. Such determination may be made, for example, using the logged driving pattern relating to step 510. The determination may consider whether the user override was invoked by the vehicle operator (at step 550).

When a vehicle passes over a section of road the vehicle causes damage to the section. The extent of this damage is proportional to both the velocity and acceleration of the vehicle. Changes in velocity result in greater force being applied to the surface, and thereby greater damage. Presently the distribution of these forces is non-uniform and, as a result, damage occurs non-uniformly. The time to repair (minor and major) is determined by the most damaged road portion of a road segment. Therefore, if we can more uniformly distribute these forces then we can increase the time to repair.

For a given vehicle, our goal is to minimize its contribution to the shortening of the time to repair. To that end, we now describe the problem formulation.

Figure 6:
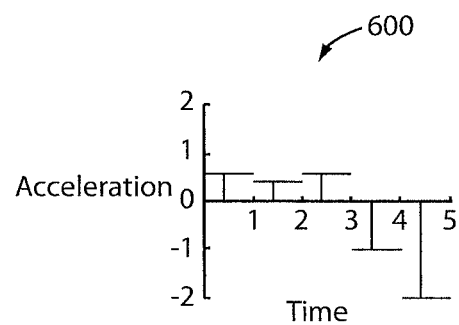
FIG. 6 shows a plot 600 of vehicle acceleration versus time, in accordance with an embodiment of the present principles.

FIG. 6 shows a plot 600 of vehicle acceleration versus time, in accordance with an embodiment of the present principles. Let us represent the vehicle acceleration profile as a fixed-width step function as follows:

$$a(t) = \Sigma_{i=0}^{M-1} \alpha_i I_{A_i}(t) \forall t \in \Re,$$

where $M \geq 1$, $\alpha_i \in \Re$, $A_i$ is the i-th interval, and $I_A(\cdot)$ is the indicator function of A: $I_{A_i}(t)=1$ if $t \in A$ and 0 otherwise. The period of the step function $\delta$ determines the intervals as follows:

$$A_i = [\delta(i-1), \delta i] \text{ for } i = 1, \ldots, M.$$

Figure 7:
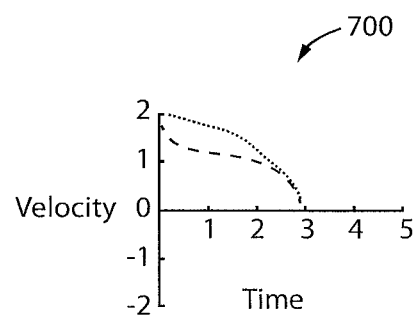
FIG. 7 shows a plot 700 of vehicle velocity versus time, in accordance with an embodiment of the present principles.
Figure 8:
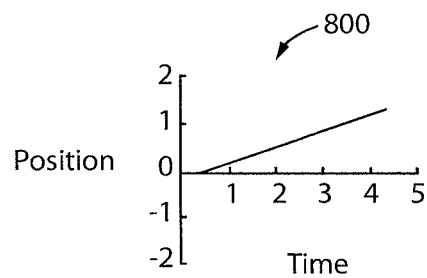
FIG. 8 shows a plot 800 of vehicle position versus time, in accordance with an embodiment of the present principles.

The variables in our optimization, the $\alpha_i$'s, define the aforementioned acceleration profile. FIG. 7 shows a plot 700 of vehicle velocity versus time, in accordance with an embodiment of the present principles. FIG. 8 shows a plot 800 of vehicle position versus time, in accordance with an embodiment of the present principles. The velocity profile is the integral of the acceleration profile, and the position profile is the integral of the velocity profile as follows:

$$v(t) = \int_{t_0}^{t} a(t) \cdot dt \text{ and } x(t) = \int_{t_0}^{t} v(t) \cdot dt \tag{1}$$

Some of the constraints on our optimization problem change with the context. For example, the speed limit of a road places an upper bound on velocity. If the vehicle is soon to enter a lower velocity road segment, then this will necessitate braking. Conversely, if a vehicle is soon to enter a higher velocity road segment, then acceleration is possible. Accordingly, at each point in time there is a constraint on the velocity as follows:

$$v(t) \leq V_{max}(x(t)) \tag{2}$$

where $V_{max}$ denotes the maximum legal velocity for a segment.

Traffic signals also place constraints on the velocity. For example, stops signs require the vehicle to come to a complete stop at a specified location, as do traffic lights.

The presence of other vehicles on the road introduces position constraints, which are a function of velocity and stopping distance as follows:

$$X_{min}(y(t)) \leq x(t) \leq X_{max}(y(t)),$$

where y(t) includes the position of all other vehicles, $X_{max}$ denotes the upper bound on the horizontal position, and $X_{min}$ denotes the lower bound on the horizontal position.

The wear profile $w_i(x)$ produced by the passage of vehicle i is a function $\phi(\cdot)$ of position, velocity and acceleration as follows:

$$w_i(x) = \phi(x(t), v(t), a(t)) \tag{3}$$

Figure 9:
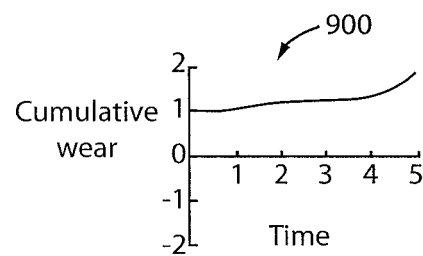
FIG. 9 shows a plot 900 of cumulative wear versus time, in accordance with an embodiment of the present principles.

FIG. 9 shows a plot 900 of cumulative wear versus time, in accordance with an embodiment of the present principles. Let us also define W(x,t) to be the cumulative wear function, which varies with time and space. For simplicity, we can also define $W_i(x)$ to be the cumulative wear distribution before the i-th vehicle passage. Therefore, we have the following:

$$W_{i+1}(x) = W_i(x) + w_i(x). \tag{4}$$

The problem formulation leads to two objectives: minimizing the aggregate wear increment; and minimizing the maximum wear for the segment. The aggregate wear increment is as follows:

$$\int w_i(x) \cdot dx \tag{5}$$

and the maximum wear is achieved through a constraint as follows:

$$W_{max} \geq W_{i+1}(x) \, \forall x. \tag{6}$$

These two objectives have non-equal importance, so we define a priority factor $\phi(\cdot)$. The objective function is as follows:

$$\min z = W_{max} + p \cdot \int w_i(x) \cdot dx. \tag{7}$$

The appropriate solver for the above problem formulation depends primarily on $\phi(\cdot)$. Candidate solvers include, but are not limited to, commercial linear programming (LP) and mixed integer programming (MIP) software, or some form of metaheuristic such as genetic algorithms (GA), particle swarm optimization (PSO), covariance matrix adaptation evolution strategy (CMA-ES) or simulated annealing.

Figure 10:
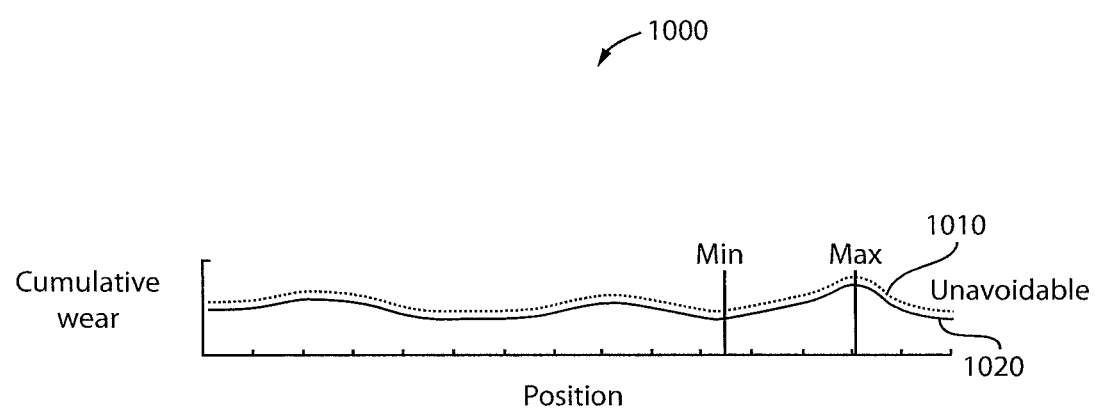
FIG. 10 shows a plot 1000 of cumulative wear versus position, in accordance with an embodiment of the present principles.

FIG. 10 shows a plot 1000 of cumulative wear versus position, in accordance with an embodiment of the present principles. In particular, FIG. 10 shows the cumulative wear on a road segment. The plot 1000 shows two cumulative wear patterns, a top pattern 1010 and a bottom pattern 1020. The top pattern 1010 indicates the incremental wear due to the passage of a vehicle. A component of this wear is unavoidable, but the wear due to velocity changes can be mitigated through optimization as disclosed herein. For example, we do not want additional wear to occur at the maximum (Max) point, we would prefer the additional wear to occur at the minimum (Min) point.

If the present principles are used to directly control the vehicle then there may need to be a manual override option for the driver for safety reasons. This is analogous to "cruise control" systems which allow the driver to override with the brake pedal. Such override option is provided in step 340 of method 300 of FIG. 3, and step 550 of method 500 of FIG. 5.

If the present principles are used to inform the driver of a maximized drive pattern, then it is important that the actual drive pattern is logged such that there is a degree of accountability. Such a logging option is provided in step 310 of method 300 of FIG. 3, step 410 of method 400 of FIG. 4, and step 510 of method 500 of FIG. 5. Moreover, a compliance determination option with respect to such logging is provided in step 350 of method 300 of FIG. 3, step 440 of method 400 of FIG. 4, and step 560 of method 500 of FIG. 5.

In an embodiment which will now be described, we use a dynamic, non-linear transformation for the brake and accelerator sensitivity, thus increasing or decreasing dampening of the system to effect change. This preserves the full range of input options while enabling the module to encourage less damaging drive patterns. Such a system should not noticeably impact the driver, nor should it affect emergency braking behavior.

In an embodiment, we presume that there is known data on the wear profile of a given section of road and that there are known/calculated preferred wear segments. The high level process can be described by Algorithm 1.

Algorithm 1 below is directed to the third embodiment, as follows:

---

Algorithm 1 Description of third embodiment

The maximum modification is M as measured in seconds
The maximum predicted wear for each segment S is at position Z
The minimum velocity change required to activate the system is V
The velocity change considered to be an emergency action is Q
if User action is initiated then
 if The initiated action is expected to cause a change in velocity ≥ V
 and ≤ Q then
  if The velocity change is predicted to impact position Z then
   Calculate required change C to avoid impacting position Z
   if the time to execute C ≤ M then
    Perform the action
   end if
  end if
 end if
end if

---

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An in-vehicle drive pattern optimization method, comprising:
    monitoring statuses of various vehicle functions;
    controlling, by a vehicle drive pattern optimization controller, the various vehicle functions to optimize the vehicle drive pattern for reduced road wear, responsive to an output of the monitoring step and known information at least about a road segment currently being or about to be traversed;
    logging a driving pattern of a user on the road; and
    determining compliance of a particular driver of a particular vehicle with suggested vehicle patterns for minimizing road wear using the logged driving pattern,
    wherein the vehicle drive pattern is optimized for reduced road wear based on minimizing an aggregate wear increment and minimizing a maximum wear for the road segment.

2. The in-vehicle drive pattern optimization method of claim 1, wherein the various vehicle functions comprise at least one of braking, acceleration, and steering.

3. The in-vehicle drive pattern optimization method of claim 1, further comprising providing a user override for overriding the controlling of various vehicle functions by the vehicle drive pattern optimization controller.

4. The in-vehicle drive pattern optimization method of claim 1, further comprising providing a user perceptible indication of a suggested vehicle driving pattern for reduced road wear.

5. The in-vehicle drive pattern optimization method of claim 4, wherein the user perceptible indication of the suggested vehicle driving pattern is provided at least tactilely.

6. The in-vehicle drive pattern optimization method of claim 1, wherein the known information further comprises ambient information with respect to a location of the road segment.

7. The in-vehicle drive pattern optimization method of claim 6, wherein the ambient information comprises traffic conditions, road conditions, traffic signals, speed limits, route information, an area map, and weather.

8. An in-vehicle drive pattern optimizer, comprising:
    a vehicle status monitor for monitoring statuses of various vehicle functions;
    a vehicle drive pattern optimization controller for controlling the various vehicle functions to optimize the vehicle drive pattern for reduced road wear, responsive to an output of the vehicle status monitor and known information at least about a road segment currently being or about to be traversed; and a vehicle driving pattern logging device for logging a driving pattern of a user on the road and determining compliance of a particular driver of a particular vehicle with suggested vehicle patterns for minimizing road wear using the logged driving pattern, wherein the vehicle drive pattern is optimized for reduced road wear based on minimizing an aggregate wear increment and minimizing a maximum wear for the road segment.

9. The in-vehicle drive pattern optimizer of claim 8, further comprising a user override device for overriding the controlling of various vehicle functions by the vehicle drive pattern optimization controller.

10. The in-vehicle drive pattern optimizer of claim 8, further comprising at least one of a transceiver and data input port for receiving the known information at least about the road segment.

11. The in-vehicle drive pattern optimizer of claim 8, wherein the known information further comprises ambient information with respect to a location of the road segment.

12. The in-vehicle drive pattern optimizer of claim 11, wherein the ambient information comprises traffic conditions, road conditions, traffic signals, speed limits, route information, an area map, and weather.

13. An in-vehicle drive pattern optimization method, comprising:

monitoring statuses of various vehicle functions;

controlling, by a vehicle drive pattern optimization controller, the various vehicle functions to optimize the vehicle drive pattern for reduced road wear, responsive to an output of the monitoring step and known information at least about a road segment currently being or about to be traversed;

logging a driving pattern of a user on the road; and determining compliance of a particular driver of a particular vehicle with suggested vehicle patterns for minimizing road wear using the logged driving pattern, wherein the vehicle drive pattern is optimized for reduced road wear based on a road wear profile produced by a vehicle passage, the road wear profile being a function of a vehicle position, a vehicle velocity, and a vehicle acceleration.

* * * * *